(12) United States Patent
Miller

(10) Patent No.: US 12,716,000 B2
(45) Date of Patent: Aug. 25, 2026

(54) METHODS OF SCAVENGING FORMALDEHYDE FROM PASSING AIR

(71) Applicant: SWIMC LLC, Cleveland, OH (US)

(72) Inventor: Cory G. Miller, Cleveland, OH (US)

(73) Assignee: SWIMC LLC, Cleveland, OH (US)

( * ) Notice: Subject to any disclaimer, the term of this patent is extended or adjusted under 35 U.S.C. 154(b) by 351 days.

(21) Appl. No.: 18/444,878

(22) Filed: Feb. 19, 2024

(65) Prior Publication Data

US 2024/0309221 A1 Sep. 19, 2024

Related U.S. Application Data

(63) Continuation of application No. 18/057,288, filed on Nov. 21, 2022, now Pat. No. 11,939,488, which is a continuation of application No. 17/735,553, filed on May 3, 2022, now Pat. No. 11,530,326.

(51) Int. Cl.

| | |
|---|---|
| ***C09D 5/02*** | (2006.01) |
| ***B01D 53/14*** | (2006.01) |
| ***C09D 109/08*** | (2006.01) |
| ***C09D 109/10*** | (2006.01) |
| ***C09D 175/04*** | (2006.01) |

(52) U.S. Cl.

CPC ......... *C09D 5/028* (2013.01); *B01D 53/1487* (2013.01); *C09D 109/08* (2013.01); *C09D 109/10* (2013.01); *C09D 175/04* (2013.01); *B01D 2257/708* (2013.01)

(58) Field of Classification Search

None

See application file for complete search history.

(56) References Cited

U.S. PATENT DOCUMENTS

| | | | |
|---|---|---|---|
| 5,330,788 | A | 7/1994 | Roberts |
| 5,612,130 | A | 3/1997 | Smirnov et al. |
| 6,762,230 | B2 | 7/2004 | Brandenburger et al. |
| 9,255,212 | B2 | 2/2016 | Song et al. |
| 9,403,949 | B2 | 8/2016 | Song et al. |
| 10,087,333 | B2 | 10/2018 | Gaschler et al. |
| 2001/0036513 | A1 | 11/2001 | Capoccia |
| 2002/0081421 | A1 | 6/2002 | Bagwell et al. |
| 2010/0190021 | A1 | 7/2010 | Eva et al. |
| 2011/0281115 | A1 | 11/2011 | Kania et al. |
| 2012/0245267 | A1 | 9/2012 | Blanchard et al. |

(Continued)

FOREIGN PATENT DOCUMENTS

| | | |
|---|---|---|
| CA | 1162904 | 2/1984 |
| CN | 101020794 A | 8/2007 |
| CN | 106153611 | 11/2016 |

(Continued)

OTHER PUBLICATIONS

Kelly, Thomas J., et al. "Emission Rates of Formaldehyde from Materials and Consumer Products Found in California Homes" Environ. Sci. Technol. 1999, 33, 81-88, 8 pages.

(Continued)

*Primary Examiner* — Brit E. Anbacht

(57) ABSTRACT

Methods of scavenging formaldehyde from passing air such as in the interior of buildings by exposing a cured coating composition to passing air. The coating composition includes a binder, pigment, and a formaldehyde scrubbing urea compound. A cured coating formed from the coating composition absorbs formaldehyde and other air pollutants from passing air.

21 Claims, 3 Drawing Sheets

(56) References Cited

U.S. PATENT DOCUMENTS

| | | | |
|---|---|---|---|
| 2013/0261238 | A1 | 10/2013 | Arango |
| 2020/0291249 | A1 | 9/2020 | Chamberlain et al. |

FOREIGN PATENT DOCUMENTS

| | | | |
|---|---|---|---|
| CN | 106928766 | | 7/2017 |
| CN | 106977890 | | 7/2017 |
| CN | 108299594 | | 7/2018 |
| EP | 0003870 | A1 | 9/1979 |
| WO | 2006063304 | | 6/2006 |
| WO | 2020182724 | A1 | 9/2020 |

OTHER PUBLICATIONS

Szczurek, Andrzej, et al. “Formaldehyde Removal by the Internal Wall Paint—Preliminary Study” E3S Web of Conferences 44, 00173 (2018), https://doi.org/10.1051/e3sconf/20184400173, 8 pages.

Basf, Acronal 296 D, technical data sheet, Mar. 2019, 3 pages.

Extended European Search Report for related EP Application No. 23800195.2 dated Mar. 27, 2026.

Figure 1: Formaldehyde Scavenging HPLC Results
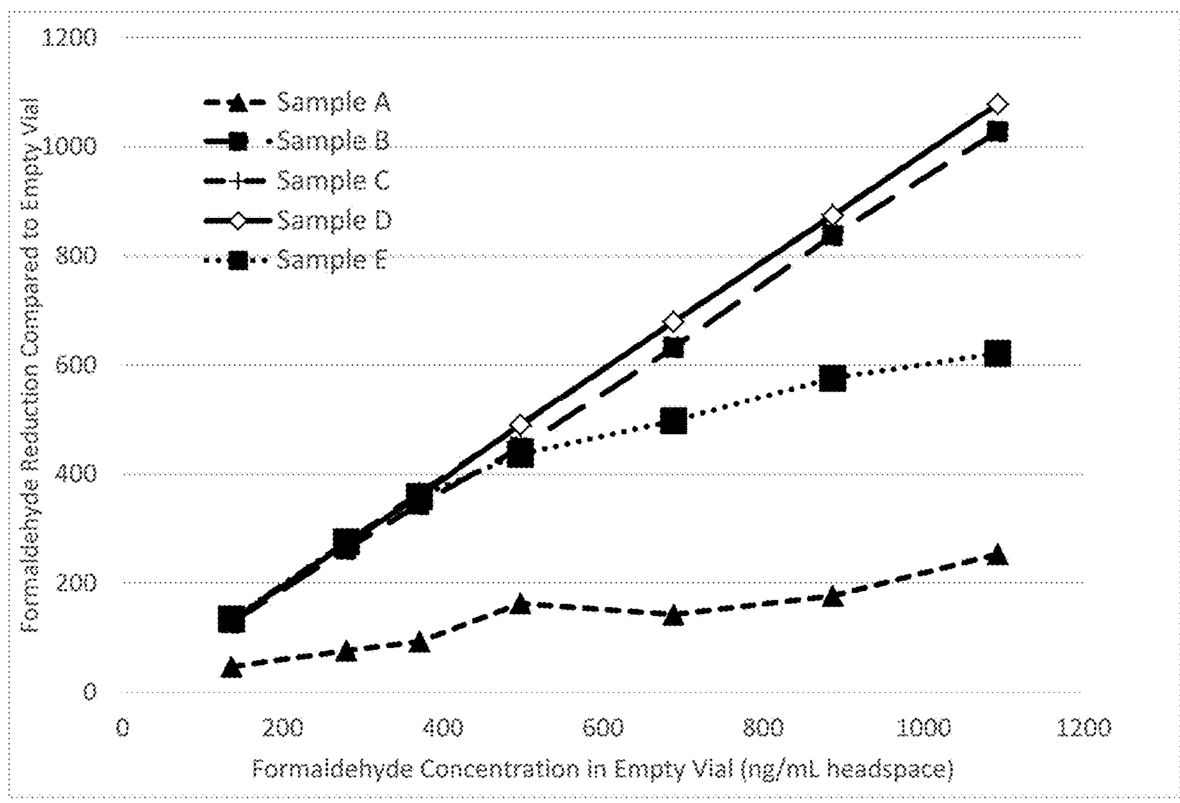

Figure 2A: Microscopic Application Quality of Example Coating Composition A (Control)
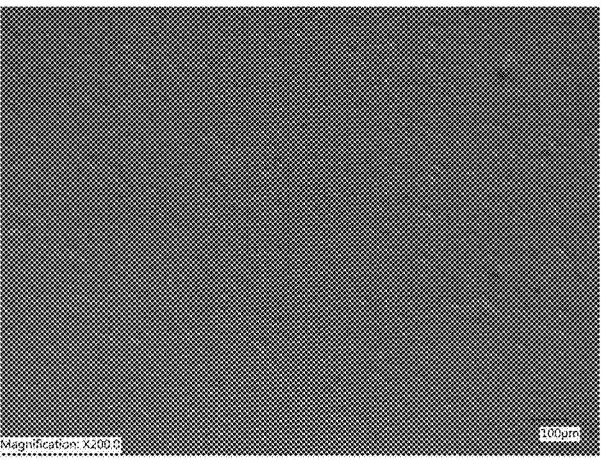
Figure 2B: Microscopic Application Quality of Example Coating Composition B
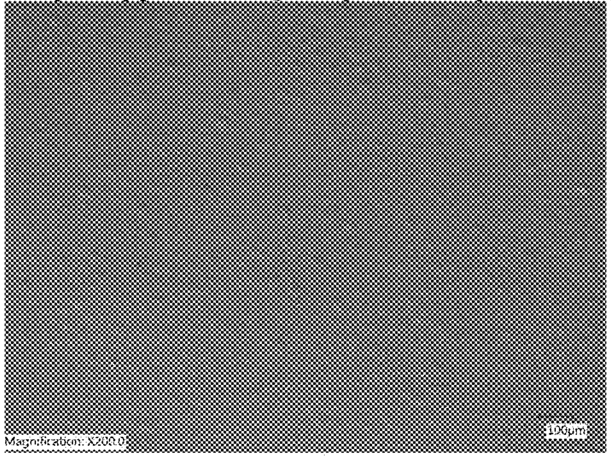

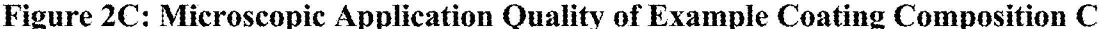
Figure 2C: Microscopic Application Quality of Example Coating Composition C
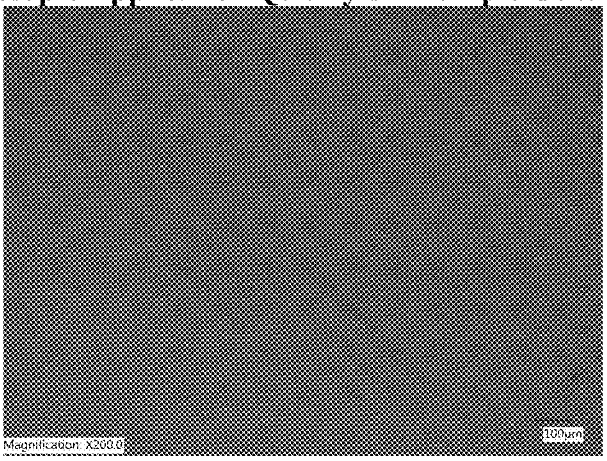
Figure 2D: Microscopic Application Quality of Example Coating Composition D
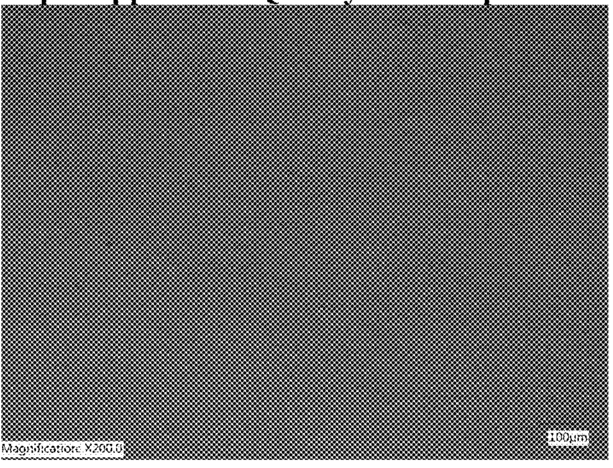

METHODS OF SCAVENGING FORMALDEHYDE FROM PASSING AIR

CROSS REFERENCE TO RELATED APPLICATIONS

This application is a continuation of U.S. application Ser. No. 18/057,288, filed Nov. 21, 2022, which is a continuation of U.S. application Ser. No. 17/735,553, filed May 3, 2022 (now U.S. Pat. No. 11,530,326). Each of the foregoing applications are incorporated herein by reference in its entirety.

BACKGROUND

Individuals spend large amounts of time indoors, in homes, commercial spaces, and other public indoor areas. Indoor air, however, can sometimes contain contaminants from a variety of sources, including cleaning agents, combustion gasses, cooking fumes, emissions from structural components like wood composites, flooring, carpeting, and adhesives, as well as contaminants from occupants, like personal care and skin products. Recently, building practices have reduced the amount of outdoor air introduced into an indoor space, preferring recirculated air to save energy costs. As a result, demand has increased for solutions to improve indoor air quality.

Indoor air contaminants can take many forms. These include VOCs (volatile organic compounds) such as formaldehyde; combustion bi-products like nitrogen oxides (NOx), sulphur oxides (SOx) and carbon monoxide (CO); ozone; radon, a naturally-occurring carcinogenic gas from soils; particulates like tobacco smoke; as well as noxious and innocuous odors from personal care products and food preparation.

Although identified by the World Health Organization in 2004 as carcinogenic, formaldehyde remains in widespread use in many architectural materials such as chipboard, MDF, plywood, artificial panels, adhesives, wallpaper, and flooring. Formaldehyde may be released over long periods of time—spanning years—from such materials.

Architectural paints and coatings are ubiquitously used to protect and decorate walls. The widespread use of architectural paints and other coatings in architectural and building applications makes them especially well-suited to trap and scavenge airborne contaminants such as formaldehyde in indoor spaces. Therefore, there is a need for a coating composition able to scavenge airborne formaldehyde and other contaminants.

SUMMARY

In a first aspect, disclosed is an aqueous coating composition comprising an aqueous carrier liquid, a polymeric binder, one or more additives, and a formaldehyde scrubbing urea compound.

The invention may be combined with one or more optional additional features, alone or in combination with any other additional feature: wherein the coating composition is essentially free of an amine-based catalyst; wherein the amine-based catalyst is triethylenediamine; wherein the urea composition is present in an amount of at least 0.2 weight percent based on the weight of the aqueous coating composition; wherein the urea composition is present in an amount of at least 0.5 weight percent based on the weight of the aqueous coating composition; wherein the urea composition is present in an amount of at least 1.0 weight percent based on the weight of the aqueous coating composition; wherein the urea composition is present in an amount of at most 1.5 weight percent based on the weight of the aqueous coating composition; wherein the urea composition is present in an amount of at most 2.0 weight percent based on the weight of the aqueous coating composition; wherein the urea composition is present in an amount of at most 3.0 weight percent based on the weight of the aqueous coating composition.

Other optional, additional features to which the invention may be combined, alone or in combination, include the following: wherein the urea compound is urea; wherein the coating composition further comprises a pigment; wherein the coating composition has a VOC of less than 150 g/L; wherein the coating composition has a VOC of less than 100 g/L; wherein the coating composition has a VOC of less than 50 g/L; wherein the coating composition contains essentially no VOCs; wherein the coating composition further comprises a surface active agent; wherein the surface active agent is a phosphate ester surfactant; wherein the coating composition is essentially free of an alkyl phenol ethoxylate surfactant; wherein the surface active agent is a defoamer; wherein the aqueous coating composition further comprises at least one of a coalescent, a rheology modifier, a filler, an extender, a biocide, or a UV stabilizer; and/or wherein the coating composition has a pigment to volume concentration (PVC) of between about 25 to about 75.

Other optional, additional features to which the invention may be combined, alone or in combination, include the following: wherein the polymeric binder comprises at least one of a (meth)acrylic latex, a vinyl acrylic latex, or a styrene acrylic latex; wherein the at least one of a (meth) acrylic latex, a vinyl acrylic latex, or a styrene acrylic latex is formed from reactants comprising a seed latex; and/or wherein the polymeric binder comprises a polyurethane.

Disclosed in a second aspect is a coated article comprising a substrate, and a coating on the substrate, wherein the coating includes at least one layer formed from the aqueous coating composition of the present invention.

Other optional, additional features to which the invention may be combined, alone or in combination, include the following: wherein the substrate is drywall; wherein the substrate is wood; wherein the substrate is brick; wherein the substrate is plaster; wherein the substrate is cementitious fiberboard; wherein the substrate is stucco; wherein the substrate is vinyl siding, and/or wherein the substrate is cement.

Disclosed in a third aspect is a coating formed from the aqueous coating composition of the present invention.

Disclosed in a fourth aspect is a method of coating a substrate with a coating formed from the aqueous coating composition of the present invention.

Disclosed in a fifth aspect is a method for formaldehyde abatement comprising removing formaldehyde from air using the coated article of the present invention.

BRIEF DESCRIPTION OF THE DRAWINGS

FIG. 1 shows formaldehyde scavenging HPLC test results of the compositions disclosed in Example 1 of the present disclosure.

FIGS. 2A, 2B, 2C, and 2D show microscopic images of applied and cured coatings of the coating compositions described in Example 2 of the present disclosure. FIG. 2A shows control Composition A. FIGS. 2B, 2C, and 2D, respectively, show Example Coating Compositions B, C, and D of the present disclosure.

DEFINITIONS

A "latex" polymer means a dispersion or emulsion of polymer particles formed in the presence of water and one or more dispersing or emulsifying agents (e.g., a surfactant, alkali-soluble polymer, or mixtures thereof) whose presence is required to form the dispersion or emulsion. The dispersing or emulsifying agent is typically separate from the polymer after polymer formation. In some examples, a reactive dispersing or emulsifying agent may become part of the polymer particles as they are formed.

The recitation of a numerical range using endpoints includes all numbers subsumed within that range (e.g., 1 to 5 includes 1, 1.5, 2, 2.75, 3, 3.80, 4, 5, etc.).

The terms "a," "an," "the," "at least one," and "one or more" are used interchangeably. Thus, for example, an aqueous coating composition that contains "an" additive means that the aqueous coating composition includes "one or more" additives.

The term "comprises" and variations thereof do not have a limiting meaning where these terms appear in the description and claims.

The term "(meth)acrylic acid" includes either or both of acrylic acid and methacrylic acid, and the term "(meth) acrylate" includes either or both of an acrylate and a methacrylate.

The term "free of," "do not contain," "does not contain," "does not include any" and similar phrases are used herein, such phrases are not intended to preclude the presence of trace amounts of the pertinent structure or compound which may be present but were not intentionally used, e.g., due to the presence of environmental contaminants.

The term "essentially free of" means that a composition does not include any of the identified compound as a component intentionally added to the composition.

Test Methods

Volatile Organic Compounds ("VOC"s) are defined by regulation of the United States Environmental Protection Agency to be: any compound of carbon, excluding carbon monoxide, carbon dioxide, carbonic acid, metallic carbides or carbonates, and ammonium carbonate, which participates in atmospheric photochemical reactions, other than exempt compounds identified in Title 40 Code of Federal Regulations, Sec. 51.100. The amount of VOC present in a composition may be measured by gas chromatography via ASTM D6886-18, titled "Standard Test Method for Determination of the Weight Percent of Individual Volatile Organic Compounds in Waterborne Air-Dry Coatings by Gas Chromatography." VOC amounts are reported in grams/Liter less exempt compounds (g/L).

Formaldehyde scavenging is a measure of the ability of a coating to capture formaldehyde from passing air. Formaldehyde scavenging is measured by the Formaldehyde Scavenging HPLC Test. In the Formaldehyde Scavenging HPLC Test, a small, measured quantity of coating is sealed in a vial with a known amount of formaldehyde vapor. After equilibration for 24 hours, the amount of formaldehyde remaining in the vial is measured and compared to a control vial which contains the same amount of formaldehyde vapor but no coating. Specific steps of the test are as follows:

a) Part A: Generation of Standard Solutions. Seven standard solutions are prepared by mixing the following amounts of formaldehyde and an acetonitrile carrier into a 2 mL HPLC autosampler vial in the following amounts (μL formaldehyde:mL acetonitrile): 5:1, 7:1, 10:1, 15:1, 20:1, 25:1, 5:2, to generate, respectively, solutions containing the following concentrations of formaldehyde in ppm: 1841, 2572, 3663, 5468, 7255, 9024, 923. 3 μL of each vial are then injected into a 20 mL vial and swept with nitrogen according to the method described in Part B and the formaldehyde content measured by the identified HPLC conditions. A calibration curve is generated to relate area under HPLC peak to formaldehyde concentration in headspace.

b) Part B: Nitrogen sweep and HPLC Measurement: The formaldehyde amount in the headspace of a vial is measured by sweeping the headspace of each vial with nitrogen gas (using a dual needle arrangement to pierce the vial septa) for 3 minutes, the nitrogen gas then flowing through a second sealed vial containing a cartridge of 2,4-Dinitrophenylhydrazine (DNPH). Prior to testing, DNPH cartridges are purchased and stored individually in air-tight envelopes in a refrigerator, then warmed to room temperature prior to testing. Any formaldehyde in the nitrogen gas reacts to form formaldehyde 2,4-dinitropheyl hydrazone (DNPH-FA). After the three minute nitrogen sweep, the DNPH cartridge is removed from the vial and washed with 4 mL acetonitrile into a clean 20 mL glass vial. The acetonitrile wash containing DNPH-FA is then sealed using a septa, and 1 mL of solution is transferred into an autosampler vial. HPLC is run on the sample according to the following conditions:

Column: ODS Hypersil 5 μm 200 mm×4.6 mm;
Guard: ODS Hypersil 5 μm 10 mm×4 mm;
Flow rate: 1 mL/min;
Mobile phase: 50% water, 50% acetonitrile;
Injection volume: 20 μL;
Column temperature: room temperature;
Column Pressure: 60 bars;
UV detector: 365 nm;
Retention time of DNPH-FA derivative: 6.5 minutes;
Run time: 10 minutes.

c) Part C: Coating Compositions Sample Preparation and Measurement: The coating composition is applied to release paper using a 4 mil drawdown bar and allowed to dry in air at room temperature for two days. A 6 mm circle of coated release paper is obtained using a hole punch. The coated film is peeled from the release paper and weighed. 3 μL of each of seven standard solutions of formaldehyde and a blank of 3 μL acetonitrile are injected into the vial using an automated analytical syringe. One circle is added to each of eight small (e.g., 20 mL) sealed vial and allowed to equilibrate for 24 hours. The formaldehyde amount in the headspace is then measured by the nitrogen sweep and HPLC conditions stated above and the formaldehyde content reported in ng/mL based on the calibration curve.

d) Part D: Analysis. The difference between the headspace formaldehyde concentration in the seven standards and seven samples are then calculated and reported.

Washability refers to the relative ease of removing dirt, soil, discolorations, and the like, from a dried film applied to a substrate surface, typically an interior architectural surface such as a wall, for example. The soil or dirt is typically removed by washing with abrasive and/or non-abrasive cleaning compositions. To measure washability, a standard test method, ASTM D3450-00 (Standard Test Method for Washability Properties of Interior Architectural Coatings) is used.

Scrub or scrub resistance refers to the ability of the surface of a coating film or paint film to resist being worn away or to maintain its original appearance when rubbed with or against an abrasive surface, typically during cleaning. Scrub resistance can be evaluated through ASTM D2486-17 (Standard Test Method for Scrub Resistance of Wall Paints).

Burnish refers to the ability of a coating to retain its gloss value after being subjected to mechanical forces, such as abrasion. Burnish may be measured through ASTM D6736-08.

Blocking refers to the tendency or ability of a coating or paint film to stick to itself after application and curing. Blocking may be measured through ASTM D4946-89 (2017) titled "Standard Test Method for Blocking Resistance of Architectural Paints."

DETAILED DESCRIPTION

Coating compositions of the present invention contain an aqueous carrier liquid, a polymeric binder, and a formaldehyde scrubbing urea compound. In some approaches, coating compositions of the present invention do not require and are essentially free of amine-based catalysts employed to speed formaldehyde absorption, such as triethylendiamine.

Compounds having urea functionality of the present invention have the structure:

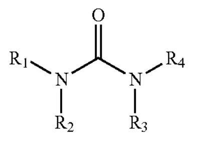

where R1, R2, R3, and R4 are the same or different linear or branched alkyl or aromatic groups or Hydrogen. Compounds having urea functionality are preferably urea, 2-hydroxyethyl urea, bis(hydroxymethyl) urea, or combinations thereof. In some approaches, the urea compound is present in the coating composition at a concentration of at least 0.2 weight percent based on the total weight of components in the coating composition, or preferably at least 0.5 weight percent, 1.0 weight percent, 1.5 weight percent, 2.0 weight percent, or 2.5 weight percent based on the total weight of components in the coating composition. In some approaches, the urea compound is present in the coating composition at a concentration of at most 3.0 weight percent based on the total weight of components in the coating composition, preferably at most 2.0 weight percent, or even more preferably at most 1.0 weight percent based on the total weight of components in the coating composition. Inclusion of urea compounds in the coating composition allows for a coating that is surprisingly able to scavenge formaldehyde and other pollutants from passing air and trap such pollutants in the coating, without the inclusion of an amine-based absorption catalyst such as diethylenetriamine.

Without being bound by theory, it is believed that formaldehyde passing in air is absorbed into a coating formed from the coating composition, where it reacts with the urea compound to yield monomethyl urea, which then polymerizes via condensation reaction to form a urea-formaldehyde resin as shown in the reaction mechanism below, resulting in a compound stable and entrapped in the coating.

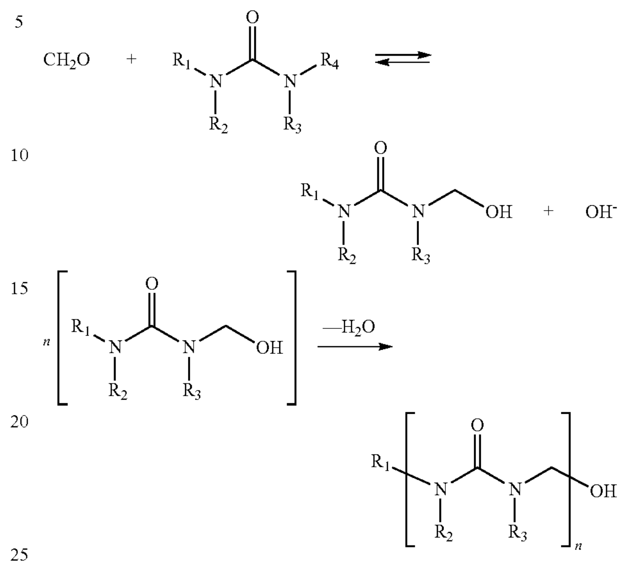

The non-gaseous urea-formaldehyde reaction product is thus bound in the coating, thereby removing formaldehyde from passing air. It is further believed that the overabundance of urea in the coating relative to the amount of passing formaldehyde drives the production of urea-formaldehyde resin, which encourages further absorption of formaldehyde from passing air.

Conventional solutions to abate formaldehyde via coating rely on inclusion in the coating of a binder that contains a monomer thought to react with formaldehyde. For instance, Formashield®, available from Dow Corporation, is marketed as a binder in paint that "actively and reversibly remove[s] formaldehyde from the ambient air . . . " While conventional solutions can provide some formaldehyde abatement from passing air the formaldehyde-absorbing capacity of this solution tends to be limited at higher concentrations of formaldehyde. Put another way, the amount of formaldehyde that can be abated by these conventional solutions tends to be capped at an upper limit, above which no additional formaldehyde will be abated from passing air.

In contrast, formaldehyde absorption of the present invention surprisingly is not limited at higher concentrations. While not wishing to be limited by theory, it is believed that inclusion of a relative abundance of urea compound relative to passing formaldehyde, makes formaldehyde absorption of the inventive coating compositions substantially not limited by stoichiometry of the formaldehyde-reacting compound in the coating composition. As a further benefit, some urea compounds in the present invention are relatively simple organic molecules, in contrast to more complex molecules needed as monomers in conventional solutions.

In addition, in contrast to solutions in the prior art, coatings formed from an aqueous coating composition of the present invention in some approaches surprisingly do not require an amine-based absorption catalyst to speed the absorption of passing pollutants into the coating, and thus is essentially free of an absorption catalyst that includes an amine structural unit, such as triethylenediamine.

A coating composition of the present invention may include, for example, a paint, a clear-coat, a stain, an aerosol, a sealant formulation, or the like.

In some embodiments, the invention includes a method for preparing a coating composition. Generally, coating compositions are made by combining and blending one or more waterborne resins to form a binder, thinning the binder through further addition of liquid, additives, and any other diluents. Conventional manufacturing processes often involve four or more stages, these including pre-thin stage, a grind stage, a wash stage, and a thindown stage. In the pre-thin stage, one or binder resins may be mixed with a liquid within a thindown tank. Low-shear mixing may be applied in the thindown tank to form a pre-thin mixture. In the grind stage, pigments and other additives that will not homogenize under low-shear mixing may be dispersed into a carrier liquid under high shear conditions. The grind stage may be carried out in a high-shear mixing device, such as mill. The high shear applied in the grind stage breaks up agglomerates of particles and wet particles with a liquid. The composition of the liquid added when thinning the grind may be the same as or different from the composition of the carrier liquid used when preparing the grind. Next, in the wash stage, a wash liquid, which may have a composition that is the same as or different from the composition of the carrier liquid, may be pumped into the high-shear mixing device to move the grind paste into the thindown tank. Finally, in a thindown stage, the grind paste, the carrier liquid, the wash liquid, and the pre-thin mixture may be blended together in the thindown tank under low shear conditions. In this stage, the coating composition concentrate may be further let down through further addition of liquid, which may have the same composition as or a different composition from the carrier liquid. The method may employ these conventional stages, or the coating composition may be prepared by other suitable methods. For example, the method may employ continuous manufacturing using component slurries.

In the present invention, the urea compound may be added at any stage of the process, separately or together with another liquid or solid component. The urea compound is preferably separately added to the grind in the grind stage, although it may be first mixed with a liquid and then added to the grind. The urea compound may be added to either the liquid or the binder resin at the thindown stage or separately added to the mix in the thindown stage. The urea compound, may be added separately or together with a liquid in the wash stage.

Aqueous coating compositions of the present invention also include a polymeric binder and a carrier. In some examples, the aqueous coating composition may include 20-45 weight percent binder, more preferably 25-40 weight percent binder, and even more preferably 30-35 weight percent based on the total weight of the aqueous coating composition.

The polymeric binder may be any suitable polymeric binder. Prior to addition to a coating composition, the polymeric binder may have the form of a latex, may be dispersed in the carrier liquid (e.g., in an emulsion stabilized colloidally or using a surfactant), or present as a solute in the carrier liquid (e.g., in a solution polymer).

In some approaches, the polymer binder may be a waterborne polyurethane polymer, a (meth)acrylate, acetate (e.g., ethylene-vinyl acetate), or vinyl acrylic polymer.

In some approaches, the latex copolymer may include a (meth)acrylic, a vinyl acrylic latex, or a styrene acrylic latex polymer. The latex copolymer may be formed from reactants including methyl acrylate, ethyl acrylate, propyl acrylate, butyl acrylate, 2-ethylhexyl acrylate, methyl methacrylate, ethyl methacrylate, propyl methacrylate, 2-ethylhexyl methacrylate, hydroxyethyl acrylate, hydroxyethyl methacrylate, hydroxybutyl acrylate, hydroxybutyl methacrylate, glycidyl methacrylate, 4-hydroxybutyl acrylate glycidyl ether, 2-(acetoacetoxy)ethyl methacrylate (AAEM), diacetone acrylamide (DAAM), acrylamide, methacrylamide, methylol (meth) acrylamide, styrene, a-methyl styrene, vinyl toluene, vinyl acetate, vinyl propionate, allyl methacrylate, and mixtures thereof. Some preferred monomers include styrene, methyl methacrylate, methacrylic acid, acetoacetoxy ethyl methacrylate, butyl acrylate, butyl methacrylate, and the like. Some monomers, such as AAEM, may be selected for inclusion so as to provide an additional mechanism for the coating composition to scrub formaldehyde from passing air.

The polymer binder may be synthetic or may be a naturally occurring polymer, biological polymer, or a bio-based polymer, such as a polysaccharide, a polypeptide, a lipid, a nucleic acid-based polymer, either crosslinked or uncrosslinked.

In some approaches, the binder may be a poly(ethylene-vinyl acetate) "PEVA," a vinyl ester homopolymer or copolymer, or a silane or fluorine containing latex emulsion.

In some examples, the reactants that form the latex copolymer also include an ethylenically unsaturated polar component. For example, the ethylenically unsaturated polar component may include an ethylenically unsaturated monomer including at least one alcohol group, an ethylenically unsaturated ionic monomer, an at least partially neutralized ethylenically unsaturated ionic monomer, or the like. The at least partially neutralized ethylenically unsaturated ionic monomer may be a salt form of the ethylenically unsaturated ionic monomer, and the salt form may be formed prior to, during, or after reaction of the ethylenically unsaturated ionic monomer with the other monomers in the reactants to form the latex copolymer.

In some examples, the ethylenically unsaturated polar monomer may include an acid- or anhydride-functional ethylenically unsaturated monomer or an at least partially neutralized acid- or anhydride-functional ethylenically unsaturated monomer. For example, the ethylenically unsaturated polar monomer may include acrylic acid, methacrylic acid, crotonic acid, fumaric acid, maleic acid, 2-methyl maleic acid, itaconic acid, 2-methyl itaconic acid, anhydride variants thereof, at least partially neutralized variants thereof, or combinations thereof.

Aqueous coating compositions of the present invention also may also include one or more additives, including coalescents, rheology modifiers, surface active-agent, pigments, fillers, extenders, biocides, and UV stabilizers, in amounts and concentrations known to those skilled in the art. Preferably all additives and the latex binder of the coating composition are selected such that the coating composition will have less than 150 g/L VOC, preferably less than 100 g/L VOC, and even more preferably less than 50 g/L VOC.

The aqueous coating composition may contain one or more optional coalescents to facilitate film formation. Coalescents suitable for use in the aqueous coating compositions will be known to persons having ordinary skill in the art or can be determined using standard methods. Exemplary coalescents include glycol ethers such those sold under the trade names as EASTMAN™ EP, EASTMAN™ DM, EASTMAN™ DE, EASTMAN™ DP, EASTMAN™ DB and EASTMAN™ PM from Eastman Chemical Company, Kingsport, Tennessee, and ester alcohols such as those sold under the trade names TEXANOL™ ester alcohol from Eastman Chemical Company. The optional coalescent may be a low VOC coalescent such as is described in U.S. Pat. No. 6,762,230 B2.

The latex copolymers disclosed above may, in some examples, be formed and/or stabilized with one or more emulsifiers (e.g., surfactants), used either alone or together. Examples of suitable nonionic emulsifiers include tert-octylphenoxyethylpoly(39)-ethoxyethanol, dodecyloxypoly(10)ethoxyethanol, nonylphenoxyethyl-poly(40)ethoxyethanol, polyethylene glycol 2000 monooleate, ethoxylated castor oil, fluorinated alkyl esters and alkoxylates, polyoxyethylene (20) sorbitan monolaurate, sucrose monococoate, di(2-butyl) phenoxypoly(20)ethoxyethanol, hydroxyethylcellulosepolybutyl acrylate graft copolymer, dimethyl silicone polyalkylene oxide graft copolymer, poly(ethylene oxide)poly(butyl acrylate) block copolymer, block copolymers of propylene oxide and ethylene oxide, 2,4,7,9-tetramethyl-5-decyne-4,7-diol ethoxylated with ethylene oxide, N-polyoxyethylene(20)lauramide, N-lauryl-N-polyoxyethylene(3)amine and poly(10)ethylene glycol dodecyl thioether. Examples of suitable anionic emulsifiers include sodium lauryl sulfate, sodium dodecylbenzenesulfonate, potassium stearate, sodium dioctyl sulfosuccinate, sodium dodecyldiphenyloxide disulfonate, nonylphenoxyethylpoly(1)ethoxyethyl sulfate ammonium salt, sodium styrene sulfonate, sodium dodecyl allyl sulfosuccinate, linseed oil fatty acid, sodium, potassium, or ammonium salts of phosphate esters of ethoxylated nonylphenol or tridecyl alcohol, sodium octoxynol-3-sulfonate, sodium cocoyl sarcocinate, sodium 1-alkoxy-2-hydroxypropyl sulfonate, sodium alpha-olefin (C14-C16)sulfonate, sulfates of hydroxyalkanols, tetrasodium N-(1,2-dicarboxy ethyl)-N-octadecylsulfosuccinamate, disodium N-octadecylsulfosuccinamate, disodium alkylamido poly-ethoxy sulfosuccinate, disodium ethoxylated nonylphenol half ester of sulfosuccinic acid and the sodium salt of tert-octylphenoxyethoxypoly(39)ethoxyethyl sulfate Aqueous coating compositions of the present invention may include a rheology package comprising one or more thickeners or rheology modifiers to yield a coating composition with appropriate low, medium, and high shear flow characteristics. Suitable rheology packages are described in U.S. Published Patent Application 2020/0291249. Thickeners may include hydroxyethyl cellulose (HEC), xanthan gum, alginates, guar gum, and other cellulose derivatives. Other rheology agents include waterborne clay; a hydrophobically modified alkali-swellable emulsion (HASE); or an associative thickener such as a hydrophobically enhanced urethane (HEUR), a polyether polyol (PEPO), or a hydrophobically modified ethoxylated aminoplast thickener (HEAT).

Waterborne clays include, for example, a magnesium aluminum phyllosilicate such as attapulgite ($(Mg,Al)_2Si_4O_{10}(OH)\cdot4(H_2O)$), hectorite ($Na_{0.3}(Mg,Li)_3Si_4O_{10}(OH)_2$), an organically modified hectorite, a synthetic hectorite, or the like. Examples are available under the trade designations MIN-U-GEL® 400 from Active Minerals International, LLC, Sparks, Maryland; and ATTAGEL® 40 and ATTAGEL® 50 from BASF SE, Ludwigshafen, Germany.

Example HASE rheology agents include those available under the trade designations ACRYSOL™ TT-935 from Dow Chemical Company, Midland, Michigan; POLYPHOBE® TR-116 from Arkema Inc., King of Prussia, Pennsylvania; RHEOTECH™ 3800 from Arkema Inc., King of Prussia, Pennsylvania; POLYPHOBE™ PP 102 from Arkema Inc., King of Prussia, Pennsylvania; RHEOLATE® 1 from Elementis Specialties, Inc., East Windsor, New Jersey; ACRYSOL™ ASE-60 from Dow Chemical Company, Midland, Michigan; ACRYSOL™ TT-615, from Dow Chemical Company, Midland, Michigan; ACRYSOL™ DR-300, from Dow Chemical Company, Midland, Michigan; POLYPHOBE® TR-117 from Arkema Inc., King of Prussia, Pennsylvania; and ACRYSOL™ RM-5 from Dow Chemical Company, Midland, Michigan.

Example associative thickeners include those available under the trade designations ACRYSOL™ RM-2020 NPR from Dow Chemical Company, Midland, Michigan; ACRYSOL™ SCT-275 from Dow Chemical Company, Midland, Michigan; ACRYSOL™ RM-825 from Dow Chemical Company, Midland, Michigan; ACRYSOL™M RM-8W from Dow Chemical Company, Midland, Michigan; ACRYSOL1υ RM-12W from Dow Chemical Company, Midland, Michigan; RHEOLATE® 350 from Elementis Specialties, Inc., East Windsor, New Jersey; AQUAFLOW™ NHS-310 from Ashland, Inc., Covington, Kentucky; AQUAFLOW™ NHS-350 from Ashland, Inc., Covington, Kentucky; OPTIFLO® L100 from Byk GmbH, Wesel, Germany; OPTIFLO® H3300 VF from Byk GmbH, Wesel, Germany; and OPTIFLO® H370 from Byk GmbH, Wesel, Germany.

The aqueous coating composition may include a surface-active agent (e.g., surfactant) either as part of the rheology package, as part of the aqueous coating composition, or both. The surface-active agent may modify affect dispersion of the rheology package in the aqueous coating composition, modify the interaction of the coating composition with the substrate or with a prior applied coating, or both. The surface-active agent affects qualities of the aqueous coating composition including how the aqueous coating composition is handled, how it spreads across the surface of the substrate, and how it bonds to the substrate. The surface-active agent can modify the ability of the aqueous coating composition to wet a substrate and also may be referred to as a wetting agent. Surface-active agents may also provide leveling, defoaming, or flow control properties, and the like. If the aqueous coating composition includes a surface-active agent, the surface-active agent is preferably present in an amount of less than 5 wt. %, based on the total weight of the aqueous coating composition. Surface-active agents suitable for use in the coating composition will be known to persons having ordinary skill in the art or can be determined using standard methods. Some suitable surface-active agents include those available under the trade designations STRODEX™ KK-95H, STRODEX™ PLF100, STRODEX™ PKOVOC, STRODEX™ LFK70, STRODEX™ SEK50D and DEXTROL™ OC50 from Dexter Chemical L.L.C., Bronx, New York; HYDROPALAT™ 100, HYDROPALAT™ 140, HYDROPALAT™ 44, HYDROPALAT™ 5040 and HYDROPALAT™ 3204 from Cognis Corporation, Cincinnati, Ohio; LIPOLIN™ A, DISPERS™ 660C, DISPERS™ 715W and DISPERS™ 750W from Degussa Corporation, Parsippany, New Jersey.; BYK™ 156, BYK™ 2001 and ANTI-TERRA™ 207 from Byk Chemie, Wallingford, Connecticut; DISPEX™ A40, DISPEX™ N40, DISPEX™ R50, DISPEX™ G40, DISPEX™ GA40, EFKA™ 1500, EFKA™ 1501, EFKA™ 1502, EFKA™ 1503, EFKA™ 3034, EFKA™ 3522, EFKA™ 3580, EFKA™ 3772, EFKA™ 4500, EFKA™ 4510, EFKA™ 4520, EFKA™ 4530, EFKA™ 4540, EFKA™ 4550, EFKA™ 4560, EFKA™ 4570, EFKA™ 6220, EFKA™ 6225, EFKA™ 6230 and EFKA™ 6525 from Ciba Specialty Chemicals, Tarrytown, New York;

SURFYNOL™ CT-111, SURFYNOL™ CT-121, SURFYNOL™ CT-131, SURFYNOL™ CT-211, SURFYNOL™ CT 231, SURFYNOL™ CT-136, SURFYNOL™ CT-151, SURFYNOL™ CT-171, SURFYNOL™ CT-234, CARBOWET™ DC-01, SURFYNOL™ 104, SURFYNOL™ PSA-336, SURFYNOL™ 420, SURFYNOL™ 440, ENVIROGEM™ AD-01 and ENVIROGEM AE01 from Air Products & Chemicals, Inc., Allentown, Pennsylvania.; TAMOL™ 1124, TAMOL 850, TAMOL 681, TAMOL™ 731 and TAMOL™ SG-1 from Rohm and Haas Co., Philadelphia, Pennsylvania; IGEPAL™ CO-210, IGEPAL™ CO-430, IGEPAL™ CO-630, IGEPAL™ CO-730, and IGEPAL™ CO-890 from Rhodia Inc., Cranbury, New Jersey; T-DET™ and T-MULZ™ products from Harcros Chemicals Inc., Kansas City, Kansas; polydimethylsiloxane surface-active agents (such as those available under the trade designations SILWET™ L-760 and SILWET™ L-7622 from OSI Specialties, South Charleston, West Virginia, or BYK™ 306 from Byk-Chemie) and fluorinated surface-active agents (such as that commercially available as FLUORAD™ FC-430 from 3M Co., St. Paul, Minnesota). Preferably, the surfactant is free of alkylphenol ethoxylates (APEO).

In some examples, the surface-active agent may be a defoamer. The aqueous coating composition may include a single surface-active agent, or multiple surface-active agents, e.g., a first surface-active agent and a second defoamer. Some suitable defoamers include those sold under the trade names BYK™ 018, BYK™ 019, BYK™ 020, BYK™ 022, BYK™ 025, BYK™ 032, BYK™ 033, BYK™ 034, BYK™ 038, BYK™ 040, BYK™ 051, BYK™ 060, BYK™ 070, BYK™ 077 and BYK™ 500 from Byk Chemie; SURFYNOL™ DF-695, SURFYNOL™ DF-75, SURFYNOL™ DF-62, SURFYNOL™ DF-40 and SURFYNOL™ DF-110D from Air Products & Chemicals, Inc.; DEEFO™ 3010A, DEEFO™ 2020E/50, DEEFO™ 215, DEEFO™ 806-102 and AGITAN™ 31BP from Munzing Chemie GmbH, Heilbronn, Germany; EFKA 2526, EFKA 2527 and EFKA 2550 from Ciba Specialty Chemicals; FOAMAX™ 8050, FOAMAX™ 1488, FOAMAX™ 7447, FOAMAX™ 800, FOAMAX™ 1495 and FOAMAX 810 from Degussa Corp.; FOAMASTER™ 714, FOAMASTER™ A410, FOAMASTER™ 111, FOAMASTER™ 333, FOAMASTER™ 306, FOAMASTER™ SA-3, FOAMASTER™ AP, DEHYDRAN™ 1620, DEHYDRAN™ 1923 and DEHYDRAN™ 671 from Cognis Corp.

The aqueous coating composition may also include one or more pigments, which provide the paint with both decorative and protective features. Pigments are solid particles used to provide the paint with various qualities, including but not limited to color, opacity, and durability. Pigments and other solids add bulk to the paint and their levels are related to the gloss or flatness of the paint. Some suitable pigments include titanium dioxide white, carbon black, lampblack, black iron oxide, red iron oxide, yellow iron oxide, brown iron oxide (a blend of red and yellow oxide with black), phthalocyanine green, phthalocyanine blue, organic reds (such as naphthol red, quinacridone red and toulidine red), quinacridone magenta, quinacridone violet, DNA orange, or organic yellows (such as Hansa yellow). The aqueous coating composition can also include a gloss control additive or an optical brightener, such as that commercially available under the trade designation UVITEX™ OB from Ciba-Geigy. In some approaches, the pigment-to-volume (PVC) ratio of the coating composition may be from about 25 to about 75.

In some examples, the aqueous coating composition may include an optional filler or inert ingredient. Fillers or inert ingredients extend, lower the cost of, alter the appearance of, or provide desirable characteristics to the aqueous coating composition before and after curing. Fillers and inert ingredients suitable for use in the aqueous coating composition will be known to persons having ordinary skill in the art or can be determined using standard methods. Some suitable fillers or inert ingredients include, for example, clay, glass beads, calcium carbonate, talc, silicas, feldspar, mica, barytes, ceramic microspheres, calcium metasilicates, organic fillers, and the like.

In certain applications it may also be desirable to include in the aqueous coating composition a biocide that provides wet-state and/or dry-film preservation. Suitable wet-state biocides are known in the art and include isothiazolines such as 2-methyl-4-isothiazolin-3-one (MIT), 5-chloro-2-methyl-4-isothiazolin-3one (CMIT), benzisothiazolinone (BIT), butylbenz-isothiazolinone (BBIT), and dichlorooctylisothiazolinone (DCOIT), methyl-benzlmidazole-2-yl carbamate, 3-iodo-2-propynyl-butyl carbamate (IPBC), propiconazole, zinc pyrithione, sodium pyrithione, and zinc oxide. Some suitable biocides or fungicides include those sold under the trade names ROZONE™ 2000, BUSAN™ 1292 and BUSAN 1440 from Buckman Laboratories, Memphis, Tennessee; POLYPHASE™ 663 and POLYPHASE™ 678 from Troy Chemical Corp., Florham Park, New Jersey; and KATHON™ LX from Rohm and Haas Co.

In certain applications it may also be desirable to include in the aqueous coating composition an optional UV stabilizer. UV stabilizers may include encapsulated hydroxyphenyl-triazine compositions and other compounds known to persons having ordinary skill in the art, for example, TINUVIN™ 477DW, commercially available from BASF Corporation.

The aqueous coating composition may also include other ingredients that modify properties of the aqueous coating composition as it is stored, handled, or applied, and at other or subsequent stages. Waxes, flatting agents, mar and abrasion additives, and other similar performance enhancing additives may be employed as needed in amounts effective to upgrade the performance of the cured coating and the aqueous coating composition. Some suitable wax emulsions to improve coating physical performance include those sold under the trade names MICHEM™ Emulsions 32535, 21030, 61335, 80939M and 7173MOD from Michelman, Inc. Cincinnati, Ohio and CHEMCOR™ 20N35, 43A40, 950C25 and 10N30 from ChemCor of Chester, New York. Desirable performance characteristics of the coating include chemical resistance, abrasion resistance, hardness, gloss, reflectivity, appearance, or combinations of these characteristics, and other similar characteristics. For example, the composition may include abrasion resistance promoting adjuvants such as silica or aluminum oxide (e.g., sol gel processed aluminum oxide).

Other optional additives for use in the aqueous coating compositions herein are described in Koleske et al., Paint and Coatings Industry, April 2003, pages 12-86. Some performance enhancing additives that may optionally be employed include coalescing solvent(s), dispersants, amines, preservatives, biocides, mildewcides, fungicides, glycols, pigments, colorants, dyes, heat stabilizers, leveling agents, anti-cratering agents, curing indicators, plasticizers, fillers, sedimentation inhibitors, ultraviolet-light absorbers, optical brighteners, and the like to modify properties of the aqueous coating composition.

The aqueous coating composition may be used to coat substrates, e.g., as a primer coat, a topcoat, or a combination primer coat and topcoat. For example, the aqueous coating composition may be used to architectural materials, including brick, concrete, stucco, wood, gypsum board, drywall, Hardieboard, and the like. As other examples, the aqueous coating composition may be used to coat other materials, such as metals or alloys used in automobiles or other machines, polymeric materials, or the like. The coating composition may be applied by any suitable method, including roller, brush, or air spray. The coating composition may be cured by allowing the coating composition to dry, or by heat, UV, or chemical crosslinking.

The disclosure includes, but is not limited to the following embodiments.

Embodiment 1: an aqueous coating composition comprising: an aqueous carrier liquid; a polymeric binder; one or more additives; and a formaldehyde scrubbing urea compound.

Embodiment 2: The aqueous coating composition of any preceding embodiment, wherein the coating composition is essentially completely free of an amine-based catalyst.

Embodiment 3: The aqueous coating composition of embodiment 2, wherein the amine-based catalyst is triethylenediamine.

Embodiment 4: The aqueous coating composition of any preceding embodiment, wherein the urea compound is urea.

Embodiment 5: The aqueous coating composition of any preceding embodiment, wherein the urea composition is present in an amount of at least 0.2 weight percent based on the weight of the aqueous coating composition.

Embodiment 5: The aqueous coating composition of any preceding embodiment, wherein the urea composition is present in an amount of at least 0.5 weight percent based on the weight of the aqueous coating composition.

Embodiment 6: The aqueous coating composition of any preceding embodiment, wherein the urea composition is present in an amount of at least 1.0 weight percent based on the weight of the aqueous coating composition.

Embodiment 7: The aqueous coating composition of any preceding embodiment, wherein the urea composition is present in an amount of at most 1.5 weight percent based on the weight of the aqueous coating composition.

Embodiment 8: The aqueous coating composition of any preceding embodiment, wherein the urea composition is present in an amount of at most 2.0 weight percent based on the weight of the aqueous coating composition.

Embodiment 9: The aqueous coating composition of any preceding embodiment, wherein the urea composition is present in an amount of at most 3.0 weight percent based on the weight of the aqueous coating composition.

Embodiment 10: The aqueous coating composition of any preceding embodiment, wherein the urea compound is urea.

Embodiment 11: The aqueous coating composition of any preceding embodiment, further comprising a pigment.

Embodiment 12: The aqueous coating composition of any preceding claim, wherein the coating composition has a VOC of less than 150 g/L.

Embodiment 13: The aqueous coating composition of any preceding claim, wherein the coating composition has a VOC of less than 100 g/L.

Embodiment 14: The aqueous coating composition of any preceding claim, wherein the coating composition has a VOC of less than 50 g/L.

Embodiment 15: The aqueous coating composition of any preceding claim, wherein the coating composition contains essentially no VOCs.

Embodiment 16: The aqueous coating composition of any preceding embodiment, wherein the coating composition further comprises a surface active agent.

Embodiment 17: The aqueous coating composition of embodiment 16, wherein the surface active agent is a phosphate ester surfactant.

Embodiment 18: The aqueous coating composition of claim any preceding embodiment, wherein the coating composition is essentially free of an alkyl phenol ethoxylate surfactant.

Embodiment 19: The aqueous coating composition of embodiment 16, wherein the surface active agent is a defoamer.

Embodiment 20: The aqueous coating composition of any preceding embodiment, wherein the aqueous coating composition further comprises at least one of a coalescent, a rheology modifier, a filler, an extender, a biocide, or a UV stabilizer.

Embodiment 21: The aqueous coating composition of any preceding embodiment, wherein the pigment to volume concentration (PVC) of the aqueous coating composition is between about 25 and about 75.

Embodiment 22: The aqueous coating composition of any preceding embodiment, wherein the polymeric binder comprises at least one of a (meth)acrylic latex, a vinyl acrylic latex, or a styrene acrylic latex.

Embodiment 23: The aqueous coating composition of embodiment 22, wherein the at least one of a (meth)acrylic latex, a vinyl acrylic latex, or a styrene acrylic latex is formed from reactants comprising a seed latex.

Embodiment 24: The aqueous coating composition of any preceding embodiment, wherein the polymeric binder comprises a polyurethane.

Embodiment 25: A coated article comprising a substrate; and a coating on the substrate wherein the coating includes at least one layer formed from the aqueous coating composition of any preceding embodiment.

Embodiment 26: The coated article of embodiment 25, wherein the substrate is drywall.

Embodiment 27: The coated article of embodiment 25, wherein the substrate is wood.

Embodiment 28: The coated article of embodiment 25, wherein the substrate is brick.

Embodiment 29: The coated article of embodiment 25, wherein the substrate is cement.

Embodiment 30: The coated article of embodiment 25, wherein the substrate is plaster.

Embodiment 31: The coated article of embodiment 25, wherein the substrate is cementitious fiberboard.

Embodiment 32: The coated article of embodiment 25, wherein the substrate is stucco.

Embodiment 33: The coated article of embodiment 25, wherein the substrate is vinyl siding.

Embodiment 34: A method comprising coating a substrate with a coating formed from the aqueous coating composition of any one of embodiments 1 to 24.

Embodiment 35: A method for formaldehyde abatement from air comprising removing formaldehyde from air using a coated article of any of embodiments 25 through 33.

The disclosure is illustrated by the following examples, which are employed for the purposes of explanation and are not intended to limit the scope of the invention. Unless otherwise indicated, all paints identified by brand name are available from The Sherwin-Williams Company, Cleveland, Ohio.

EXAMPLES

Example 1

Samples of a conventional acrylic latex paint, ProMar® 200 Zero VOC EggShell EW base1 were mixed thoroughly with 1 wt. %, 2 wt. %, and 3 wt. % urea based on the total weight of the coating. The samples, as well as a control sample of ProMar 200 Zero VOC EggShell EW base without added urea and Harmony® Eggshell EW paint,[2] available from The Sherwin-Williams Company, Cleveland Ohio, were tested for formaldehyde scavenging properties according to the Formaldehyde Scavenging HPLC Test described herein. No absorption catalyst, such as an amine-based catalyst, was added to any sample or the control. The data is reported below. The data is further plotted in FIG. 1.

1 ProMar 200 Zero VOC EggShell EW base is used as a control because it is known to not include a binder marketed as having formaldehyde-abating technology.

[2] Harmony® paint is advertised as "help[ing] improve indoor air quality with Formaldehyde Reducing Technology" and is formulated with a binder resin that is marketed as removing formaldehyde from ambient air.

TABLE 1

Formaldehyde Scavenging HPLC Test Results

| | Sample Identifier | | Empty Vial Formaldehyde Concentration (ng/mL headspace) | | | | | | |
|---|---|---|---|---|---|---|---|---|---|
| | | | 136 | 279 | 370 | 497 | 688 | 887 | 1092 |
| Reduction in Formaldehyde Concentration (ng/mL Headspace) | A | ProMar 200 EggShell EW Base-Control | 48 | 77 | 93 | 163 | 143 | 177 | 253 |
| | B | ProMar 200 EggShell EW Base-1% Urea | 128 | 263 | 345 | 448 | 632 | 838 | 1028 |
| | C | ProMar 200 EggShell EW Base-2% Urea | 134 | 275 | 365 | 488 | 680 | 876 | 1078 |
| | D | ProMar 200 EggShell EW Base-3% Urea | 132 | 273 | 359 | 490 | 679 | 874 | 1079 |
| | E | Harmony ® Eggshell EW Base | 135 | 276 | 359 | 436 | 497 | 576 | 622 |

The data shows that coating compositions that contain 1 wt. %, 2 wt. %, or 3 wt. % urea surprisingly remove more urea than the same conventional acrylic latex that does not contain urea. The data additionally shows that while the capacity of Harmony paint to remove formaldehyde from passing air tends to drop above passing formaldehyde concentration of 600 ng/mL, while the inventive compositions comprising urea continue to absorb additional formaldehyde. Thus, the data indicates that Harmony paint, which contains a binder marketed as removing formaldehyde from air, becomes saturated, whereas coating compositions of the present invention including urea do not become saturated.

Example 2: Application Quality Testing

Samples A (control), B (1 wt. % urea), C (2 wt. % urea), and D (3 wt. % urea) of Example 1 were applied to aluminum substrates by a 10 mil 8-path drawdown bar. The coatings were allowed to cure for 24 hours at ambient indoor room conditions (approximately 70 F and 50% relative humidity and examined under a 200× optical microscope with reflectance illumination.

As shown in FIGS. 2A, 2B, 2C, and 2D, the results of the examination show the applied surface quality of coatings made with urea (Samples B, C, and D) are indistinguishable from that of the control. More specifically, all samples lack substantial grit (agglomeration of particles), and appear smooth.

Example 3: Coating Characteristic Testing

Coatings formed from the coating compositions of Example 1 were evaluated for coating performance characteristics.

Washability: Coatings formed from compositions A, B, C, D, and E of Example 1 were applied using a 7 mil Dow Film Caster and evaluated for washability according to the ASTM method identified herein after 100 cycles with 10 mL of an all-purpose cleaner saturated in a sponge.

TABLE 2

Washability

| | Sample | | | | |
|---|---|---|---|---|---|
| | A | B | C | D | E |
| Crayon | 10 | 10 | 10 | 10 | 10 |
| Pen | 7 | 7 | 7 | 7 | 7 |
| Pencil | 5 | 7 | 7 | 7 | 7 |
| Average All | 7.33 | 8.00 | 8.00 | 8.00 | 8.00 |

Scrubs: Scrub resistance of coating compositions from compositions A, B, C, D, and E were tested using the test method of ASTM D2486-17 Test Method B, using Sherwin-Williams® Cashmere® Interior Acrylic Latex, Low Lustre Enamel, Extra White as a reference.

TABLE 3

Scrub Resistance

| | Sample | | | | |
|---|---|---|---|---|---|
| | A | B | C | D | E |
| Reference Measurement 1 | 542 | 417 | 522 | 390 | 385 |
| Sample Measurement 1 | 883 | 618 | 244 | 147 | 476 |

TABLE 3-continued

| Scrub Resistance | | | | | |
|---|---|---|---|---|---|
| | Sample | | | | |
| | A | B | C | D | E |
| Reference Measurement 2 | 404 | 400 | 498 | 377 | 475 |
| Sample Measurement 2 | 1015 | 770 | 319 | 180 | 427 |
| Sample Average | 949 | 694 | 281.5 | 163.5 | 451.5 |
| Reference Average | 473 | 408.5 | 510 | 383.5 | 430 |
| Normalized Scrubs (% of Reference) | 201 | 170 | 55 | 43 | 105 |

The data demonstrates that sample B (ProMar 200 paint with 1% urea) maintains approximately equivalent scrub resistance compared to the same paint without urea, and better scrub resistance compared to Harmony® brand paint. Coating compositions that include 2% urea (Sample C) and 3% urea (Sample D) show decreased scrub resistance.

Dry Burnish: Dry burnish measurements were taken via 85° gloss after 5 cycles and 25 cycles of abrasion.

TABLE 4

| Dry Burnish | | | | | |
|---|---|---|---|---|---|
| | Sample | | | | |
| | A | B | C | D | E |
| Initial | 14.4 | 19.3 | 20.1 | 19.0 | 12.6 |
| 5 cycles | 15.3 | 20.1 | 24.4 | 27.3 | 13.1 |
| 25 cycles | 15.7 | 20.8 | 25.0 | 28.2 | 13.4 |
| Burnish Increase (%)-5 cycles | 6.3 | 4.1 | 21.4 | 43.7 | 4.0 |
| Burnish Increase (%)-25 cycles | 9.0 | 7.8 | 24.4 | 48.4 | 6.3 |

The data demonstrates that sample B (ProMar 200 paint with 1% urea) maintains approximately equivalent scrub resistance compared to the same paint without urea, and slightly better scrub resistance compared to Harmony® brand paint. Burnish (abrasion) resistance decreases somewhat markedly for compositions including 2% (sample C) and 3% (sample D) urea.

Blocking: Blocking measurements were taken according to ASTM D4946-89 (2017) according to the following scale. Ratings of 3 or greater are considered a "pass."

| Rating | Type of Separation | Performance |
|---|---|---|
| 5 | No tack | Excellent |
| 4 | Slight tack | Good |
| 3 | Tacky; no seal | Poor |
| 2 | 5-25% seal | Fail |
| 1 | 26-50% seal | Fail |
| 0 | 50-100% seal | Fail |

Blocking measurement data is shown below.

TABLE 5

| 24-hour Blocking Sample | | | | |
|---|---|---|---|---|
| A | B | C | D | E |
| 2.5 | 1.5 | 3 | 3 | 2 |

The data shows that the composition containing 2 and 3% urea performed better than samples containing 1% urea.

What is claimed is:

1. A method of causing a coated substrate to scavenge formaldehyde from passing air comprising:
exposing a cured coating on a substrate to passing air,
the cured coating formed from an aqueous coating composition, the coating composition including at least an aqueous carrier liquid, a polymeric binder, one or more additives, and a urea compound present in an amount of at most 1.5 weight percent based on the weight of the aqueous coating composition,
wherein the urea compound has the formula

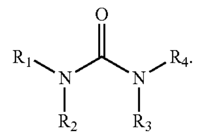

where $R_1$, $R_2$, $R_3$, and $R_4$ are each independently a linear or branched alkyl group or aromatic group or hydrogen.

2. The method of claim 1, wherein the urea compound is urea.

3. The method of claim 1, wherein the urea compound is present in the aqueous coating composition in an amount of at least 0.2 weight percent based on the weight of the aqueous coating composition.

4. The method of claim 1, wherein the urea compound is present in an amount of at least 0.5 weight percent based on the weight of the aqueous coating composition.

5. The method of claim 1, wherein the urea compound is present in the coating composition in an amount of at most 1.0 weight percent based on the weight of the aqueous coating composition.

6. The method of claim 1, wherein the coating composition has a VOC of less than 150 g/L.

7. The method of claim 6, wherein the coating composition has a VOC of less than 100 g/L.

8. The method of claim 7, wherein the coating composition has a VOC of less than 50 g/L.

9. The method of claim 8, wherein the coating composition is free of VOCs.

10. The method of claim 1, wherein coating composition further includes a coalescent, a rheology modifier, a filler, an extender, a biocide, or a UV stabilizer.

11. The method of claim 1, wherein the substrate is drywall.

12. The method of claim 1, wherein the substrate is wood.

13. The method of claim 1, wherein the substrate is brick.

14. The method of claim 1, wherein the substrate is cement.

15. The method of claim 1, wherein the substrate is an interior wall or floor.

16. The method of claim 1, wherein formaldehyde in passing air is entrapped in the coating.

17. The method of claim 16, wherein passing air reacts with the urea compound to form a polymerized urea-formaldehyde.

18. The method of claim 1, wherein the polymeric binder includes a polyurethane polymer, a (meth)acrylate polymer, a vinyl acetate polymer, or a vinyl acrylic polymer.

19. The method of claim 1, wherein the coated substrate reduces an amount of formaldehyde in air in an amount of at least 400 ng/mL when exposed to an airborne formaldehyde concentration of 700, 900, and 1100 ng/ml of air, as measured according to the Formaldehyde Scavenging HPLC Test disclosed herein.

20. The method of claim 19, wherein the amount of formaldehyde in air is reduced in an amount of at least 600 ng/ml when exposed to an airborne formaldehyde concentration of 700, 900, and 1100 ng/mL of air, as measured according to the Formaldehyde Scavenging HPLC Test disclosed herein.

21. The method of claim 20, wherein the amount of formaldehyde in air is reduced in an amount of at least 650 ng/ml when exposed to an airborne formaldehyde concentration of 700, 900, and 1100 ng/ml of air, as measured according to the Formaldehyde Scavenging HPLC Test disclosed herein.

* * * * *